United States Patent
Erbes

(10) Patent No.: US 7,861,738 B2
(45) Date of Patent: Jan. 4, 2011

(54) REMANUFACTURED MACHINE COMPONENT AND REMANUFACTURING PROCESS

(75) Inventor: Francis E. Erbes, Laredo, TX (US)

(73) Assignee: Caterpillar Inc., Peoria, IL (US)

( * ) Notice: Subject to any disclaimer, the term of this patent is extended or adjusted under 35 U.S.C. 154(b) by 476 days.

(21) Appl. No.: 12/074,402

(22) Filed: Mar. 4, 2008

(65) Prior Publication Data

US 2009/0223577 A1 Sep. 10, 2009

(51) Int. Cl.
*F16K 21/04* (2006.01)
*B23P 6/00* (2006.01)

(52) U.S. Cl. .............................. 137/15.08; 137/315.03; 29/890.121; 29/402.06; 29/557

(58) Field of Classification Search ............... 137/15.01, 137/15.08, 315.01, 315.03; 29/890.121, 29/557, 402.06
See application file for complete search history.

(56) References Cited

U.S. PATENT DOCUMENTS

| 2,416,247 | A |   | 2/1947  | Wilcox |
|-----------|---|---|---------|--------|
| 4,068,412 | A |   | 1/1978  | Camp et al. |
| 4,467,566 | A |   | 8/1984  | Ondrus, Jr. et al. |
| 4,677,723 | A | * | 7/1987  | Greene, Sr. ............ 29/890.121 |
| 4,999,911 | A | * | 3/1991  | Anderson ................ 29/888.42 |
| 5,511,299 | A | * | 4/1996  | Stockton .................. 29/402.11 |
| 6,267,653 | B1|   | 7/2001  | Klink et al. |
| 6,339,877 | B1|   | 1/2002  | Straub et al. |
| 6,488,263 | B2| * | 12/2002 | Robert ..................... 137/315.3 |
| 7,104,273 | B1| * | 9/2006  | Stafford .................... 137/15.17 |

* cited by examiner

*Primary Examiner*—Kevin L Lee
(74) *Attorney, Agent, or Firm*—Liell & McNeil

(57) ABSTRACT

A process for remanufacturing valve bodies, such as fuel injector valve bodies, includes regrinding a valve seat of a salvaged valve body with a grinding apparatus, and linking a center axis of the valve seat with a center axis of a guide bore for a valve which contacts the valve seat. Linking the center axis of the valve seat with the center axis of the bore includes contacting a locating element of the grinding apparatus with a locating surface on an outer diameter of the valve body during regrinding the valve seat. Locating on the outer diameter enables run-out between the axes to be inhibited during regrinding the valve seat based on concentric congruity between the locating surface and the bore.

20 Claims, 2 Drawing Sheets

REMANUFACTURED MACHINE COMPONENT AND REMANUFACTURING PROCESS

TECHNICAL FIELD

The present disclosure relates generally to the fields of remanufacturing and salvaging, and relates more particularly to a remanufacturing process where a center axis of a valve seat is linked with a center axis of a valve guide bore for regrinding the valve seat.

BACKGROUND

The fields of remanufacturing and salvaging machine components have greatly expanded in recent years. Many machine parts which in the past would have been scrapped are now returned to service. Giving machine components further service life not only conserves resources, but also can create new revenue sources for manufacturers, machinists and mechanics. One goal in remanufacturing many parts is returning them to original specifications. In other words, it is typically desirable to remanufacture a part such that tolerances, operation, reliability, etc. are as close as practicable to those of a new part. In some instances, remanufactured parts may even be superior to new parts, as inspection and testing of individual remanufactured parts can often be more rigorous than conventional analysis of many mass-produced new parts.

Remanufacturing parts used in certain hydraulic systems, such as fuel injectors, has a unique set of challenges. Many modern hydraulic systems utilize rapidly moving valve components to control the timing, rate and other characteristics of fluid flow. It is common in fuel injector systems to use a relatively small, rapidly moving valve to control the position or action of another component of the system, such as a plunger or admission valve. Over the course of a fuel injector's service life, its valve components may be required to actuate millions or even billions of times. The physical demands placed on such components will be readily apparent. When a fuel injector is to be remanufactured, certain functional surfaces of components of the fuel injector can be worn or otherwise damaged to the point that injector performance is compromised. Even seemingly miniscule deviations from specifications for critical components can have a relatively large effect on performance. Thus, returning certain fuel injector parts to specifications can be of paramount importance to successfully preparing a fuel injector for returning to service.

One set of fuel injector features whose dimensions, location, shape and orientation need to be relatively tightly controlled are valve seats. Over time, a valve member striking a valve seat can deform the valve seat. Fluid flowing at relatively high pressure and experiencing relatively rapid pressure changes can erode the valve seat and/or cause cavitation. U.S. Pat. No. 6,339,887 B1 to Straub et al. ("Straub") proposes one strategy for refurbishing a valve seat in a fuel injector assembly. In Straub, a tool is moved along a known reference axis to lap the valve seat. The workpiece having the subject valve seat is purportedly aligned with the known reference axis to locate the tool. Aligning of the workpiece is achieved by locating part of the tool apparatus in a bore in the workpiece. While Straub's approach might provide successful valve seat refurbishing in some instances, or for certain valve types, positioning of the tool by locating in the bore has its drawbacks. On the one hand, the bore may be improperly aligned due to tolerances in original manufacturing. Thus, the supposed alignment between the tool and known reference axis may be unreliable. On the other hand, locating within a bore can be difficult, particularly for certain valve types.

SUMMARY

In one aspect, a process for remanufacturing valve bodies includes receiving a salvaged valve body having a valve seat therein and defining a bore, and grinding the valve body, including regrinding the valve seat with a grinding apparatus. The process further includes linking a center axis of the valve seat with a center axis of the bore. Linking the center axis of the valve seat with a center axis of the bore includes establishing congruity between a first locating surface on an inner diameter of the valve body which defines the bore and a second locating surface on an outer diameter of the valve body prior to regrinding the valve seat, and contacting a locating element of the grinding apparatus with the second locating surface during regrinding the valve seat.

In another aspect, a remanufactured machine component includes a valve body having a first end, a second end and a valve seat. The valve body further defines a first bore terminating at a first side of the valve seat and a second bore terminating at a second side of the valve seat. The valve seat has a center axis and the first bore includes a locating surface having a link with the center axis of the valve seat. The remanufactured valve body further includes an outer diameter having a second locating surface with a concentric congruity with the first locating surface, and the link between the center axis of the valve seat and the center axis of the first bore is based on the concentric congruity.

In still another aspect, a valve body is remanufactured according to a process which includes receiving a salvaged valve body having a valve seat therein and defining a bore. The process further includes grinding the valve body, including regrinding the valve seat, and linking a center axis of the valve seat with a center axis of the bore. Linking the center axis of the valve seat with the center axis of the bore includes establishing congruity between a first locating surface on an inner diameter of the valve body which defines the bore and a second locating surface on an outer diameter of the valve body prior to regrinding the valve seat. Linking the center axis of the valve seat with the center axis of the bore further includes contacting a locating element of the grinding apparatus with the second locating surface during regrinding the valve seat.

DETAILED DESCRIPTION

Figure 1:
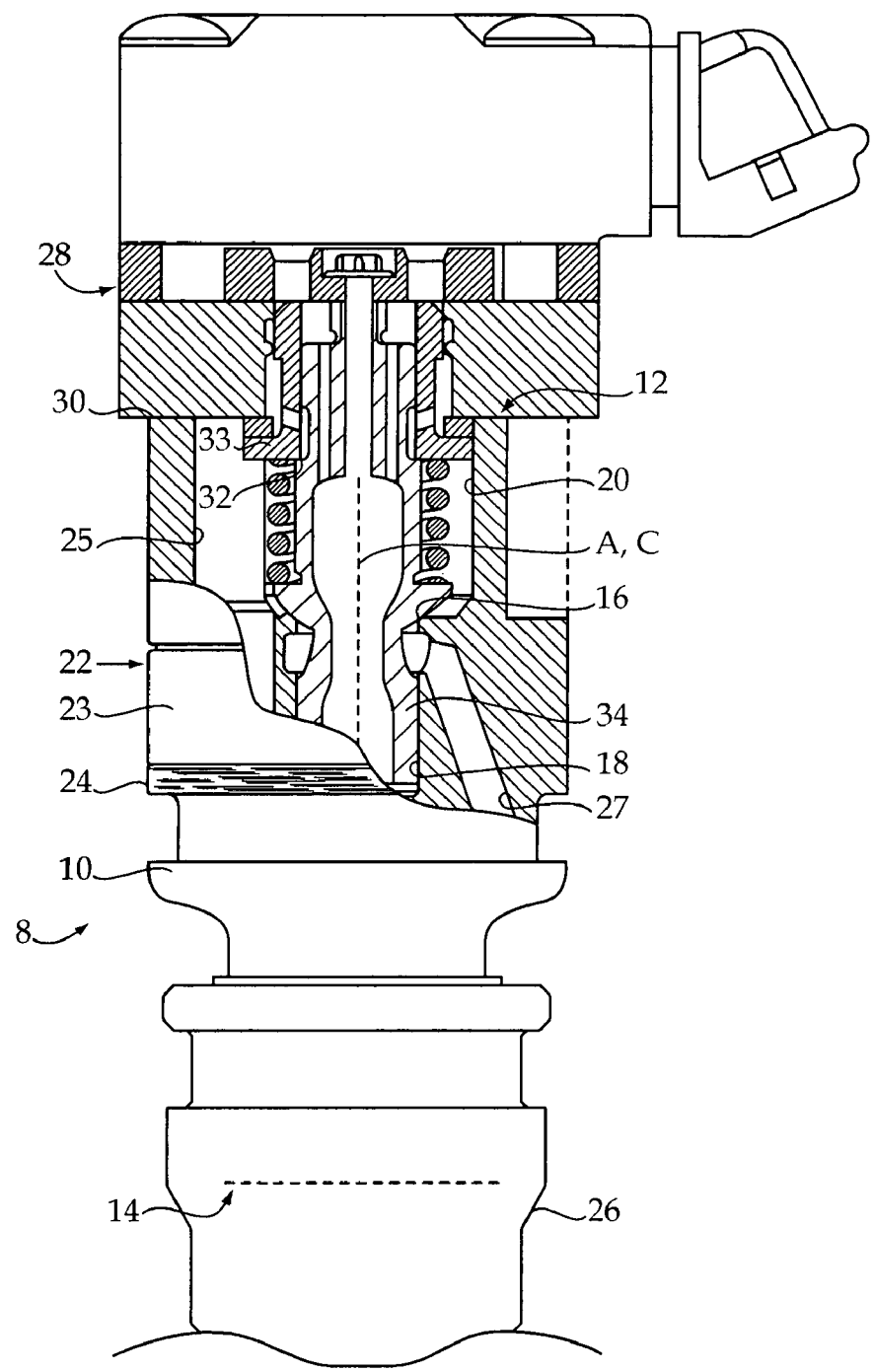
FIG. 1 is a partially sectioned side diagrammatic view of a portion of a remanufactured machine component according to one embodiment.

Referring to FIG. 1, there is shown a remanufactured machine component such as a fuel injector 8 according to one embodiment. Fuel injector 8 may include a plurality of coupled together body components, including a first body component 26 and a second body component comprising a salvaged valve body 10. Valve body 10 may comprise a control valve body and be coupled with body component 26 via threads, welding, or another suitable means. Valve body 10 may include a first end 12, and a second end 14 disposed within body component 26 and therefore shown in phantom in FIG. 1. A control valve assembly 28 may be mated with valve body 10 at a timing face 30. In one embodiment, control valve assembly 28 may comprise an electrical actuator (not shown) which is coupled with and configured to move a valve member 34 between a first position contacting a lower seat 16 and a second position contacting an upper seat 32. Upper seat 32 may be located on an insert 33 extending into valve body 10, whereas lower seat 16 may be located in material from which valve body 10 is formed.

As mentioned above, fuel injector 8 is remanufactured, meaning that at least certain of its components have been removed from service, disassembled, repaired, etc. as necessary, then reassembled for returning to service. The present disclosure contemplates a unique strategy for remanufacturing valve body 10, in particular repairing damage to valve seat 16, which is straightforward and efficient, and ensures that minimum performance specifications for fuel injector 8 will be met or exceeded. While fuel injector remanufacturing is considered to be one practical implementation of the present disclosure, it should be appreciated that valve bodies used in other fluid systems may be remanufactured without departing from the scope of the present disclosure.

Valve seat 16 comprises a reground valve seat which includes a center axis A which extends through a middle of valve seat 16. Valve seat 16 may comprise a conical valve seat and thus its center axis A may be understood as a longitudinal centerline of a cone defined by valve seat 16. A first bore 20 may be formed in valve body 10. First bore 20 terminates at a first side of valve seat 16, and in particular may terminates at one end at timing face 30 and terminates at an opposite end at valve seat 16. A second bore 18 may be formed in valve body 10 which terminates at a second side of valve seat 16, and in particular may terminate at one end at valve seat 16 and terminate at an opposite end in valve body 10 below valve seat 16. Bore 18 may comprise a guide bore for poppet valve member 34 as it travels between seats 16 and 32. In one embodiment, travel of poppet valve member 34 between seats 16 and 32 can alternately close and open fluid communications via valve seat 16 between a fluid inlet passage 27 of valve body 10 and a control passage 25. Fluid supplied via passages 27 and 25 may be used to actuate a pressurization piston for fuel within fuel injector 8, or for another purpose such as raising pressure in a nozzle supply passage for opening an admission valve of fuel injector 8. Remanufactured valve bodies and associated components used in other types of fuel injectors or other types of machine components may function in a different manner.

Bore 18 may also have a center axis C, comprising a longitudinal axis of bore 18. Axis A of valve seat 16 may have a link with center axis C. In one embodiment, the link between axes A and C may comprise a geometric link such as a relative offset or separation distance between axes A and C. The link between axes A and C might also comprise a degree of relative parallelism between axes A and C, or both relative offset and relative parallelism. Those skilled in the relevant technical arts will recognize that some tolerance, however minuscule, will always exist among different machined parts or among different features of a machined part. Thus, while axes A and C would ideally be exactly coextensive, it will typically be impossible to perfectly align axis A with axis C when valve seat 16 is reground during remanufacturing. The present disclosure, however, provides a strategy for minimizing the extent to which axes A and C are either offset or non-parallel when valve seat 16 is reground. As further described herein, axes A and C may be linked by establishing a geometric relationship between axis C and a feature of valve body 10 on its outer diameter 22, then locating off of that feature to regrind valve seat 16.

The link between axes A and C may be based on a "concentric congruity" between a locating surface 24 on outer diameter 22 of valve body 10 and another locating surface on an inner diameter of valve body 10 which comprises bore 18. Stated another way, bore 18 defines an inner diameter surface 18 of valve body 10 which comprises a first locating surface 18, and outer diameter 22 defines an outer diameter surface 24 which comprises a second locating surface 24. The concentric congruity may be understood as the extent to which locating surface 24 is concentrically congruous with bore 18. In other words, the concentric congruity is the degree to which locating surface 24 is geometrically related to bore 18 from the standpoint of concentricity. The concentric congruity may be an offset between axis C and a center axis defined by locating surface 24. The concentric congruity may also be the extent to which locating surface 24 is parallel to bore 18. A relatively larger offset between center axes of bore 18 and surface 24 or a relatively greater departure from parallelism of the respective axes, would correspond to a relatively lesser degree of concentric congruity. A smaller offset or smaller departure from parallelism between the respective axes would correspond to a relatively greater degree of concentric congruity. The concentric congruity could still further be based on the relative similarity in shape of surface 24 and bore 18. If one of surface 24 and bore 18 is relatively non-cylindrical compared with the other of surface 24 and bore 18, for example, they might be said to have a relatively lesser degree of concentric congruity. If the shapes of surface 24 and bore 18 are closer to being identical, they would have a relatively greater degree of concentric congruity. As previously stated, the concentric congruity between surface 24 and bore 18 may serve as the basis for the link between axes A and C. The more concentrically congruous surface 24 is to bore 18, the closer the link between axes A and C, and the closer axes A and C will be to being perfectly coextensive.

As alluded to above, the concentric congruity between surface 24 and bore 18 may be leveraged in regrinding valve seat 16 to repair damage in anticipation of returning valve body 10 to service. In certain embodiments, a preexisting locating surface on outer diameter 22 of valve body 10 might be selected for its concentric congruity with bore 18. A preexisting surface might exist where a valve body was originally manufactured at relatively tight tolerances, or where a locating surface was formed on an outer diameter of the subject valve body during a previous round of remanufacturing. In many instances, however, it will be desirable to form a new locating surface 24 on outer diameter 22 to ensure that the concentric congruity between locating surface 24 and bore 18 is as great as practicable. In one embodiment, locating surface 24 may be ground on outer diameter 22 while locating in bore 18, as further described herein. In FIG. 1, a surface finish associated with grinding of locating surface 24 is evident. The different surface finish of a cylindrical surface 23 which is adjacent locating surface 24, and is not ground or is ground by a different process than that of locating surface 24, is also evident. A geometric relationship between surface 23 and bore 18 may be incongruous, as compared to the geometric relationship between locating surface 24 and bore 18.

Figure 2:
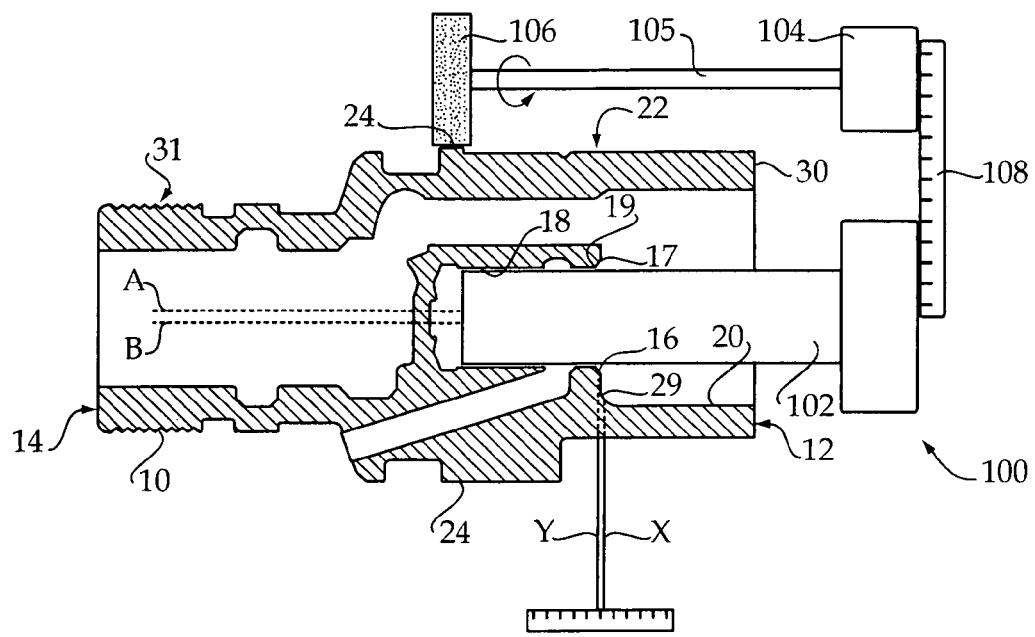
FIG. 2 is a sectioned side diagrammatic view of a valve body at one stage of a remanufacturing process, according to one embodiment.

Turning now to FIG. 2, there is shown valve body 10 at a first stage of a remanufacturing process in accordance with the present disclosure. Certain features of valve body 10 are evident in FIG. 2 which are not visible in FIG. 1, and so are discussed here in connection with FIG. 2. It will be noted that valve body 10 includes threads 31 adjacent its second end 14 for coupling with another body component of a fuel injector or other hydraulically actuated device. It will further be noted that valve seat 16 includes an upper seat edge 17 and a lower seat edge 19. In one embodiment, bore 20 extends from timing face 30 to upper seat edge 17, whereas bore 18 extends from lower seat edge 17 to a blind end in valve body 10. In some instances, it will be desirable to inspect valve body 10 prior to beginning remanufacturing. In one embodiment, a seat depth parameter of valve body 10 may be inspected to determine if valve body 10 is amenable to remanufacturing by regrinding valve seat 16. Valve seat 16 will typically consist of hardened material, such as by heat treating. If valve body 10 has already been remanufactured one or more times, and seat 16 reground, remanufacturing by regrinding valve seat 16 may not be desirable. In such a case, seat 16 may be located such that further regrinding would expose relatively soft material unsuited for serving as a valve seat. In other words, while seat 16 may be reground one or more times for remanufacturing, eventually the regrinding will expose softer material and some other remanufacturing strategy, or scrapping, will need to occur. In FIG. 2, a first line X denotes a relative position of a land area 29 at one end of bore 20, whereas a second line Y denotes a relative position of upper seat edge 17. The distance between lines X and Y might be measured to determine whether regrinding of seat 16 is likely to expose relatively soft material. Accordingly, inspecting valve body 10 might include determining a seat depth parameter, then sorting valve body 10 into one of a first category for valve bodies amenable to remanufacturing by valve seat regrinding, and a second category for valve bodies not amenable to remanufacturing by valve seat regrinding. Some other means of determining the valve seat depth parameter might also be used, or valve seat depth ignored without departing from the scope of the present disclosure.

Once it is determined that valve body 10 is amenable to remanufacturing by valve seat regrinding, valve body 10 may be coupled with a grinding apparatus 100. In particular, a locating element 102 of grinding apparatus 100 is positioned within bore 18. Positioning locating element 102 within bore 18 and contacting locating element 102 with the inner diameter of valve body 10 which defines bore 18 allows grinding apparatus 100 to use bore 18 as a first locating surface for grinding a second locating surface, e.g. surface 24. Grinding locating surface 24 in this manner can establish the concentric congruity discussed above. To this end, a reference element 108 is shown coupled between locating element 102 and a grinder comprised of a base 104, a spindle 105 and a grinding element 106.

Valve body 10 is shown in FIG. 2 as it might appear just prior to beginning to grind surface 24. With valve body 10 thusly supported and located surface 24 may be ground by engaging grinding element 106 against outer diameter 22 of valve body 10. During grinding surface 24, one or both of grinding element 106 and valve body 10 may be rotated. In one embodiment, a portion of outer diameter 22 may be selected for grinding surface 24 which is a "non-functional" surface. In other words, the portion of outer diameter 22 which is selected for grinding surface 24 thereon will typically be a surface whose location, dimensions, surface texture, and other characteristics are not relevant to the use of valve body 10 in a service environment. The non-functional portion of outer diameter 22 selected for grinding surface 24 thereon will typically also be not relevant to manufacturing or assembling valve body 10. Portions of outer diameter 22 which are engaged by a mounting apparatus for mounting valve body 10 and an associated fuel injector to an engine system might therefore be considered "functional" surfaces, in contrast to the non-functional portion selected for grinding surface 24. Also shown in FIG. 2 is a center axis B representing an axis defined by the portion of outer diameter 22 selected for grinding locating surface 24 thereon. It will be noted that center axis B is offset from center axis A defined by bore 18, although the extent of offset is somewhat exaggerated for illustrative purposes in FIG. 2.

Figure 3:
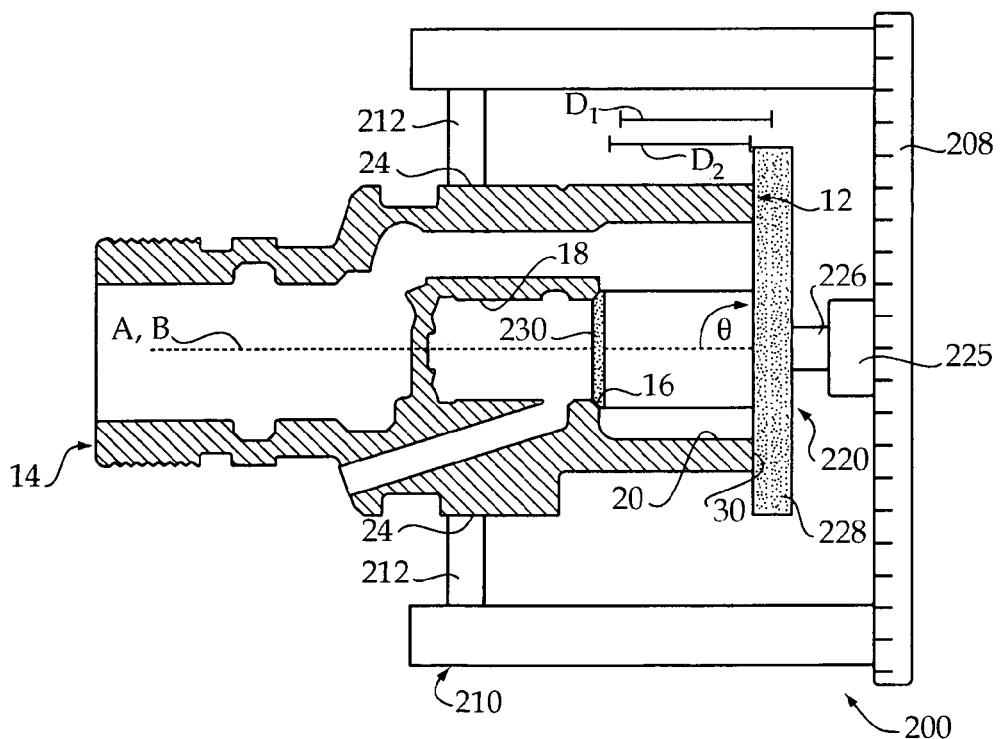
FIG. 3 is a sectioned side diagrammatic view of a valve body at another stage of a remanufacturing process, according to one embodiment.

Turning now to FIG. 3, there is shown valve body 10 coupled with a second grinding apparatus 200. Grinding apparatus 200 may include a locating element such as a chuck 210 having a set of chuck jaws 212 which contact locating surface 24. Locating surface 24 may thus be understood as a chucking surface, although in other embodiments a locating element other than a chuck might be contacted with locating surface 24 for grinding valve body 10 as described herein. It may be noted that in FIG. 3, center axis A and center axis B, defined by locating surface 24, are substantially coextensive, corresponding to the concentric congruity between locating surface 24 and bore 18. Grinding apparatus 200 may include a grinder 220 having a base 225, a spindle 226, and a single rotary grinding element having a first grinding portion 228 and a second grinding portion 230. Grinding apparatus 200 further includes a reference element 208 which allows grinder 220 to be located appropriately for grinding valve body 10. In particular, since chuck 210 contacts locating surface 24, reference element 208 may be used to position an axis of grinder 220 based on a location reference provided by locating surface 24. It will be recalled that when locating surface 24 is formed on outer diameter 22, grinding apparatus 100 locates in bore 18. Since grinder 220 is located by contacting locating surface 24 with chuck 212, seat 16 may be reground such that its center axis C, shown in FIG. 1, is linked with center axis A of bore 18 by way of the concentric congruity between bore 18 and locating surface 24.

Once valve body 10 is coupled with grinding apparatus 200, regrinding of seat 16 may commence. Seat 16 may be reground by engaging the second grinding portion 230 with seat 16. Regrinding of seat 16 will tend to change a location of seat 16 in valve body 10. In certain hydraulic systems, such as in fuel injector 8, valve bodies used therein have a timing face such as timing face 30 whose location relative to a valve seat is based on a desired travel distance and/or timing of an associated valve member. Thus, changing a location of valve seat 16 relative to timing face 30 by regrinding valve seat 16 could affect the timing of valve member 34 when fuel injector 8 is assembled with valve body 10. To compensate for changing a location of valve seat 16 within valve body 10, timing face 30 may be reground such that a specified distance between timing face 30 and valve seat 16 is maintained. In one embodiment, this is achieved by regrinding valve seat 16 and timing face 30 without decoupling chuck 210 from locating surface 24, and may take place simultaneously. To this end, first grinding portion 228 and second grinding portion 230 of grinder 220 may be located a specified distance apart that corresponds with the specified distance between valve seat 16 and timing face 30. In FIG. 3, distance $D_1$ represents a distance between valve seat 16 and timing face 30 and relative locations of valve seat 16 and timing face 30 prior to regrinding. Distance $D_2$ represents a distance between valve seat 16 and timing face 30 and relative locations of valve seat 16 and timing face 30 subsequent to regrinding. Valve body 10 may be slightly shorter in length after regrinding than when initially received after removing from service due to the removal of material from timing face 30.

It will also typically be desirable to maintain a perpendicularity between timing face 30 and axes A and C of bore 18 and valve seat 16, respectively. In FIG. 3, an angle Theta between axis A and a plane defined by timing face 30 is maintained at approximately a 90 degree angle. Since grinding/regrinding of timing face 30 may be carried out by locating from locating surface 24, a perpendicularity of timing face relative to axis A may be based on the concentric congruity between locating surface 24 and bore 18.

INDUSTRIAL APPLICABILITY

By remanufacturing salvaged valve bodies in the manner described herein, valve bodies may be efficiently remanufactured and returned to service without changes to their shape, dimensions or other characteristics which could compromise operation. The desirability of valve seat regrinding has been recognized with regard to certain technologies for some time. Traditional approaches, however, have either been cumbersome or have failed to machine the subject features of valve bodies to the relatively exacting specifications required for many applications, such as in fuel injection systems. One particular problem with earlier strategies related to the tendency for run-out between a valve seat and a valve guide bore to result when the valve seat was reground. In many hydraulic systems, a valve member has relatively little clearance with respect to its guide bore. As a result, run-out between the guide bore and the valve seat can lead to problems such as seat leak, problems with valve timing or even binding of a valve member within its guide bore. As applied to valve body remanufacturing, the present disclosure can enable inhibiting run-out between a valve seat such as valve seat 16 and a valve guide bore such as bore 18. In one embodiment, run-out between center axis A of valve seat 16 and center axis C of valve guide bore 18 can be limited to about 0.020 millimeters or less. The "link" described in connection with the center axis A of bore 18 and center axis C of valve seat 16 may thus comprise an offset distance between the respective axes which is about 0.020 millimeters or less.

The improvements in precision grinding of valve bodies according to the present disclosure are considered to result at least in part from locating for regrinding valve seat 16 and timing face 30 on outer diameter 22 of valve body 10 during regrinding. It will be recalled that both valve seat 16 and timing face 30 may be reground without decoupling valve body 10 from grinding apparatus 200, and regrinding of valve seat 16 and timing face 30 may take place simultaneously. In many earlier strategies, such as Straub described herein, a grinding apparatus is located via an inner diameter of the subject valve body. Locating in the inner diameter, then attempting to simultaneously regrind a valve seat which is located internally of the valve body, tends to be difficult. When locating on an inner diameter, the available locating surface area may be relatively small and difficult to engage with conventional tooling. Moreover, positioning a machining or grinding tool deep within the valve body while simultaneously supporting the valve body inner diameter and precisely locating a grinding tool can further complicate a regrinding process. To perform such this technique with valve bodies such as those illustrated and described herein, guide bore 18 and valve seat 16 would need to both be accessed from the same end of valve body 10.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. While the present description emphasizes keeping axes of a valve seat and valve guide bore as close together as practicable, other phenomena might be of greater concern in other systems, such as non-parallelism between a valve seat center axis and a valve guide bore center axis. The teachings of the present disclosure may also be applicable in such instances. Other aspects, features and advantages will be apparent upon an examination of the attached drawings and appended claims.

I claim:

1. A process for remanufacturing valve bodies comprising:
receiving a salvaged valve body having a valve seat therein and defining a bore;
grinding the valve body, including regrinding the valve seat with a grinding apparatus; and
linking a center axis of the valve seat with a center axis of the bore;
wherein linking the center axis of the valve seat with the center axis of the bore includes establishing congruity between a first locating surface on an inner diameter of the valve body which defines the bore and a second locating surface on an outer diameter of the valve body prior to regrinding the valve seat, and contacting a locating element of the grinding apparatus with the second locating surface during regrinding the valve seat.

2. The process of claim 1 wherein contacting a locating element of the grinding apparatus with the second locating surface comprises engaging a chuck of the grinding apparatus with the second locating surface.

3. The process of claim 2 wherein regrinding the valve seat further comprises changing a position of the valve seat within the valve body, the process further comprising compensating for changing a position of the valve seat within the valve body at least in part by grinding a timing face of the valve body without disengaging the chuck from the second locating surface.

4. The process of claim 3 further comprising maintaining a specified distance between the valve seat and the timing face during grinding the valve body by simultaneously regrinding the valve seat and grinding the timing face with a single rotary grinding element.

5. The process of claim 2 wherein grinding the valve body further comprises grinding the second locating surface on the outer diameter of the valve body, and wherein establishing congruity further comprises contacting another locating element of another grinding apparatus with the first locating surface during grinding the second locating surface.

6. The process of claim 5 wherein:
receiving a salvaged valve body further comprises receiving a salvaged valve body in which the bore comprises a guide bore for a poppet valve member and the valve seat comprises a conical valve seat; and
regrinding the valve seat further comprises repairing damage to the conical valve seat.

7. The process of claim 6 further comprising:
receiving a plurality of identical salvaged valve bodies;
inspecting each of the plurality of salvaged valve bodies, including determining a valve seat depth parameter; and
sorting each of the plurality of salvaged valve bodies into one of a first category for valve bodies amenable to remanufacturing via valve seat regrinding and a second category for valve bodies not amenable to remanufacturing via valve seat regrinding, based at least in part on determining a valve seat depth parameter.

8. The process of claim 6 wherein:
receiving a valve body comprises receiving a fuel injector valve body;
linking the center axis of the valve seat with the center axis of the bore comprises limiting run-out between the axes during regrinding to about 0.02 millimeters or less; and
grinding the second locating surface further comprises grinding a non-functional surface of the fuel injector valve body.

9. A remanufactured machine component comprising:
a remanufactured valve body having a first end, a second end and a valve seat, the valve body further defining a first bore terminating at a first side of the valve seat and a second bore terminating at a second side of the valve seat;
the valve seat having a center axis and the first bore comprising a locating surface which includes a center axis having a link with the center axis of the valve seat;
wherein the remanufactured valve body further comprises an outer diameter including a second locating surface having a concentric congruity with the first locating surface, and wherein the link between the center axis of the valve seat and the center axis of the first bore is based on the concentric congruity.

10. The remanufactured machine component of claim 9 wherein the valve seat comprises a conical valve seat, and wherein the first bore comprises a guide bore for a poppet valve configured to contact the conical valve seat.

11. The remanufactured machine component of claim 10 comprising a timing face located at the first end of the remanufactured valve body and configured to mate with an actuator subassembly, and wherein the timing face further has a perpendicularity relative to the center axis of the first bore which is based on the concentric congruity.

12. The remanufactured machine component of claim 11 wherein the second locating surface comprises a cylindrical surface and wherein the outer diameter of the remanufactured valve body further comprises a second cylindrical surface adjacent the second locating surface which is incongruous with the first locating surface.

13. The remanufactured machine component of claim 12 wherein the second locating surface comprises a chucking surface having a surface finish, and wherein the second cylindrical surface has a different surface finish.

14. The remanufactured machine component of claim 11 wherein the link between the center axis of the first bore and the center axis of the valve seat comprises a run-out distance between the center axes.

15. The remanufactured machine component of claim 14 wherein the run-out distance between the center axes is about 0.02 millimeters or less.

16. The remanufactured machine component of claim 14 comprising a fuel injector which includes the remanufactured valve body, the remanufactured valve body comprising a control valve body of the fuel injector.

17. A valve body remanufactured according to a process comprising:
receiving a salvaged valve body having a valve seat therein and defining a bore;
grinding the valve body, including regrinding the valve seat with a grinding apparatus; and
linking a center axis of the valve seat with a center axis of the bore;
wherein linking the center axis of the valve seat with the center axis of the bore includes establishing congruity between a first locating surface on an inner diameter of the valve body which defines the bore and a second locating surface on an outer diameter of the valve body prior to regrinding the valve seat, and contacting a locating element of the grinding apparatus with the second locating surface during regrinding the valve seat.

18. The valve body of claim 17 wherein grinding the valve body further comprises grinding the second locating surface on the outer diameter of the valve body with another grinding apparatus, and wherein establishing congruity further comprises contacting another locating element of the another grinding apparatus with the first locating surface during grinding the second locating surface.

19. The valve body of claim 18 wherein regrinding the valve seat further comprises changing a position of the valve seat within the valve body, the process further comprising compensating for changing a position of the valve seat within the valve body at least in part by simultaneously regrinding the valve seat and grinding a timing face of the valve body with a single rotary grinding element.

20. The valve body of claim 19 wherein receiving a valve body comprises receiving a fuel injector valve body, and wherein linking the center axis of the valve seat with the center axis of the bore comprises limiting run-out between the axes during regrinding to about 0.02 millimeters or less.

* * * * *